Sept. 19, 1967  R. F. DEERING ET AL  3,342,193
METHOD AND NOZZLE FOR INJECTING ONE FLUID INTO ANOTHER FLUID
Filed April 5, 1965  2 Sheets-Sheet 1

INVENTOR.
ROLAND F. DEERING
JOHN H. BALLARD
BY
Milton W. Lee
ATTORNEY

United States Patent Office 3,342,193
Patented Sept. 19, 1967

3,342,193
METHOD AND NOZZLE FOR INJECTING ONE FLUID INTO ANOTHER FLUID
Roland F. Deering, La Habra, and John H. Ballard, Whittier, Calif., assignors to Union Oil Company of California, Los Angeles, Calif., a corporation of California
Filed Apr. 5, 1965, Ser. No. 445,380
16 Claims. (Cl. 137—3)

This invention relates to an improved method and apparatus for discharging a horizontally flowing fluid in a substantially vertical direction, and more particularly to an improved nozzle for discharging a horizontally flowing fluid in a vertically directed, substantially symmetrical pattern.

It is often desired to introduce a fluid under pressure into a lower pressure fluid medium in such manner that the introduced fluid is discharged vertically into the lower pressure medium in a flow pattern distributed substantially uniformly about a vertical axis. Such application is frequently encountered in the processing industries wherein the fluid under pressure is introduced into a lower pressure fluid medium within an enclosed vessel or container. The requirement of vertical discharge is particularly critical where the fluid under pressure is introduced onto a distributor tray of a contact vessel for admixture with a second fluid mass flowing downwardly through the vessel, especially where the downwardly flowing fluid mass contains mixed liquid and gas phases. Poor distribution, or channeling, of the downwardly flowing fluid reduces the efficiency of the processing step; further inefficiencies being caused by improper mixing of the injected fluid with the downwardly flowing fluid mass.

One typical application to which our invention is directed is the injection of a quench fluid into a liquid-gas mixed phase reaction mixture flowing downwardly through a vertical contacting vessel, the fluid injection being made at one or more intermediate points along the vertical length of the vessel. The quench fluid is at a temperature different from that of the reactants, and is employed as a simple means of heating or cooling the reactants by direct contact therewith. In order that proper temperature control is achieved, it is necessary that the injected quench fluid be uniformly mixed with the downflowing reactants and evenly distributed over the horizontal cross-section of the vessel. Uniform mixing and redistribution can be effected by a number of different distributor arrangements conventionally employed for such purpose, which devices can be located immediately below the quench fluid injection point intermediate between adjacent spaced contact beds. With some of these devices, superior results are often achieved where the ejected fluid is symmetrically discharged in a vertical direction at the midpoint of the vessel. Discharge of the ejected fluid with any substantial horizontal asymmetry tends to produce uneven distribution of the ejected fluid within the downwardly flowing fluid mass. Further, the horizontal discharge of a fluid above a liquid distributor tray can cause undesirable hydraulic gradients of the liquid on the tray, with resulting non-uniform liquid distribution.

A conventional method of accomplishing the symmetrical discharge of a fluid vertically onto a mixing or distribution tray of a downflow contacting vessel is to insert through the side wall of the vessel a horizontal pipe terminating in a 90 degree elbow and vertical nipple, or pipe extension, pointing downwardly toward the center of the distribution tray. The downwardly directed pipe must be of sufficient length that the fluid flowing therethrough will be flowing in a substantially vertical direction with essentially no horizontal component of flow when discharged onto the tray. Although satisfactory fluid distribution can be achieved with such apparatus, the elbow and vertical nipple combination has the disadvantages of (1) being difficult to remove through the entry opening in the side wall of the vessel without entry into the vessel for disassembly, or without increasing the entry opening to an unduly large size, and (2) requiring vertical clearance to accommodate the vertical pipe extension. The requirement for additional vertical clearance most often necessitates that the overall vessel height be extended. This becomes extremely costly in large diameter commercial contacting vessels constructed of costly corrosion resistant alloys and designed for high temperature and high pressure operation, particularly where there is need for a plurality of such fluid inlets at different vertical levels in the vessel.

A horizontal pipe with a closed end wall and a vertically directed aperture effectively minimizes the withdrawal problem and the requirement of additional vertical clearance, however, the fluid is not discharged therefrom in a satisfactory pattern. The horizontally flowing fluid, because of its inertia, does not discharge through the aperture in a substantially symmetrical pattern but, depending on the relative configuration of the pike and of the aperture, a major portion of the fluid is more likely to discharge at an angle of approximately 45 degrees from horizontal and in the original direction of flow.

It is accordingly an object of the present invention to provide an improved method and apparatus for discharging a fluid under pressure substantially vertically into a lower pressure fluid medium. Another object is to provide a method and apparatus for discharging a horizontally flowing liquid in a substantially vertical direction so that the discharged fluid is symmetrically distributed about a vertical axis. A further object is to provide an improved fluid injection nozzle for horizontal insertion through an opening in the side wall of a vessel which can be conveniently withdrawn through the opening. A still further object is to provide a nozzle for vertically discharging a horizontally flowing fluid into a vessel which minimizes the vertical distance required to contain the nozzle. Other and related objects of the invention will be apparent from the following detailed description.

We have found that the foregoing objects and their attendant advantages can be realized by dividing the fluid to be injected into a plurality of horizontally flowing streams of approximately equal quantities, and then causing the divided fluid streams to flow in opposition to each other toward a vertically directed aperture through which they commonly discharge. The momentum of the horizontally flowing fluid streams is effectively dissipated in counter-opposing each other at the aperture, the combined fluid stream discharging vertically therethrough in a flow pattern having substantial horizontal symmetry. Satisfactory distribution can be effected by the convenient technique of dividing the fluid into two opposed streams.

A simple and efficient apparatus for discharging a horizontally flowing fluid stream in a substantially vertical direction comprises a horizontal conduit communicating from a high pressure fluid source and extending a distance past the desired point of discharge, the conduit having a closed downstream end and a vertically directed aperture in the conduit wall located at the discharge point. A horizontal baffle extending a distance along the length of the conduit is positioned therewithin so as to divide the conduit into two axial flow channels of substantially equal cross-sectional area, the baffle being positioned so that the vertically directed aperture lies intermediate along its length thereby permitting fluid discharge from only one of the flow channels defined by the horizontal baffle and the conduit wall. The fluid flowing through the horizontal conduit divides into first and second fluid streams of approximately equal quantity, the first fluid stream flowing directly toward the aperture, and the second fluid stream flowing through the other flow channel the length of the baffle, reversing direction and then flowing back through the first flow channel toward the aperture in opposition to the first fluid stream, the combined streams discharging through the aperture in the aforesaid manner.

The apparatus of our invention can be more readily understood by reference to the accompanying drawings of which:

Figure 1:
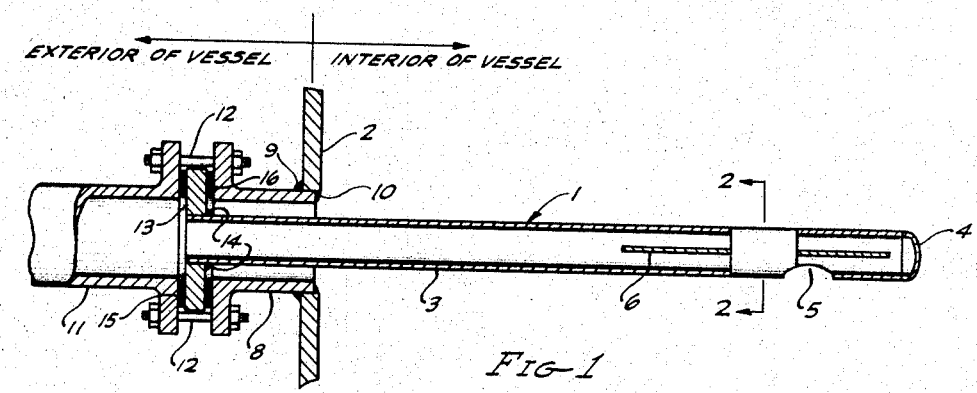
FIGURE 1 is an elevation view, in partial cross-section, showing a horizontal nozzle installed through the side wall of a vessel.
Figure 2:
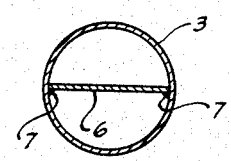
FIGURE 2 is a cross-sectional view taken along the line 2—2 of FIGURE 1 and showing the horizontal baffle installation.

Referring now to FIGURE 1, nozzle 1 is seen entering through an opening in vessel side wall 2. Nozzle 1 comprises conduit 3 having closed end 4 and vertically directed aperture 5 removed from closed end 4. Conduit 3 may be of any convenient cross-section configuration, but most suitably is a length of conventional pipe of circular cross-section. Aperture 5 may be directed either vertically upward, or vertically downward with comparable results. End 4 can be closed in any convenient manner so as to prevent discharge of the fluid therethrough. Horizontal baffle 6 is positioned within conduit 3 so as to extend a distance along the length of the conduit in either direction from aperture 5, terminating a distance from closed end 4 so as to provide fluid communication between the flow channels formed by horizontal baffle 6. As illustrated in FIGURE 2, horizontal baffle 6 is positioned within conduit 3 so as to divide the conduit into an upper and a lower flow channel of approximately equal cross-sectional area. In the case of a pipe of circular cross-section, such as illustrated at FIGURE 2, baffle 6 passes through the center point thereof to form the aforesaid flow channels. In a conduit of irregular cross-section, baffle 6 would be positioned to obtain flow channels of equivalent cross-sectional area. Baffle 6 extends from one inside wall of conduit 3 to the opposite inside wall and is held in position by any convenient means, such as welding as indicated at 7; or vertical spacers, not shown, extending upwardly and downwardly from baffle 6 to maintain the proper spacing. Such spacers can be small flat plates fixedly attached to baffle 6 in a position edgewise to the axis of conduit 3 so as to minimize the resistance to flow.

Referring again to FIGURE 1, nozzle 1 passes through entry nozzle 8 which penetrates vessel side wall 2 and is fixedly attached thereto by welds 9 and 10, or other means. Nozzle 8 is of the conventional type typically employed for communication through a vessel wall. Nozzle 8 is formed with a flanged face and bolt holes for attachment of flanged pipe 11 by conventional stud bolts and nuts 12. Flange 13 is attached to the inlet end of conduit 3, similarly by weld 14, or other means such as a threaded joint. Flange 13 is mounted between the flanged faces of nozzle 8 and pipe 11 and firmly secured there by stud bolts and nuts 12. Gaskets 15 and 16 are inserted between the mating surfaces to obtain a fluid-tight joint. The aforesaid flanged assembly not only provides a fluid-tight joint for entry of nozzle 1 through vessel side wall 2, but further provides the necessary support to maintain nozzle 1 in a horizontal position. If desired, support means can also be provided on the interior of the vessel for support of nozzle 1. A nozzle of the above-described structure not only may be easily removed from the vessel by breaking the bolted connection between pipe 11 and nozzle 8, but also requires minimum additional vertical vessel height as there are no elements protruding from horizontal conduit 3, the distribution apparatus being wholly contained therein.

The nozzle of the present invention can be effectively employed to eject a gas, a liquid, or a mixed liquid-gas phase fluid, so long as the velocity of the mixed-phase fluid is sufficiently high to maintain the fluid in turbulent flow, thereby avoiding the concentration of liquid in the lower of the flow channels. Conduit 3 should be of a sufficient cross-sectional flow area to accommodate the quantity of fluid without excessive presure drop, or excessive velocity. Normally, aperture 5 should be sufficiently sized to minimize the fluid discharge velocity, thereby reducing the jet effect of the discharging fluid. With gaseous fluids, velocities in excess of 200 feet per second are usually undesirable, and gas velocities of less than 100 feet per second are preferred. Liquid velocities in excess of 50 feet per second are similarly undesirable in most applications, and velocities of less than 20 feet per second are preferred.

In operation, fluid to be introduced into the vessel flows from a high pressure source through pipe 11 to horizontally mounted nozzle 1. The fluid flows through conduit 3, dividing into two streams of substantially equal quantity for passage through the two flow channels formed by horizontal baffle 6 and the conduit wall. One flow stream flows the length of baffle 6, then on reaching closed end 4 of conduit 3, reverses flow direction and flows backwardly through the other of the flow channels toward aperture 5. The two fluid streams impinge against one another at aperture 5, the combined streams discharging vertically therethrough in a flow pattern having substantial horizontal symmetry.

Figure 3:
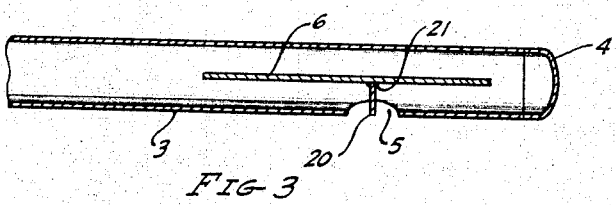
FIGURE 3 is an elevation view, in cross-section, illustrating the installation of a vertical transverse baffle at the aperture of the horizontal nozzle of FIGURE 1.
Figure 4:
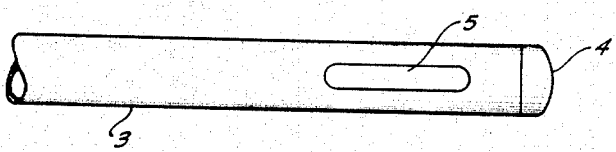
FIGURE 4 is a bottom view of a horizontal nozzle having an elongated aperture.

Improved results are obtainable with a modification illustrated in FIGURE 3. A vertical transverse impingement baffle 20 is attached to horizontal baffle 6 normal to the axis of conduit 3 and positioned adjacent and substantially at the midpoint of aperture 5. Impingement baffle 20 can be attached to horizontal baffle 6 in any convenient manner, such as by weld 21. Impingement baffle 20 has a shape substantially in configuration to the flow channel in which it is installed, thereby effectively blocking the flow of fluid therethrough from either direction, and directing such fluid outwardly through aperture 5. With the impingement baffle mounted in the described manner, the fluid flowing in either direction along conduit 3 toward aperture 5 is turned and directed generally outwardly therethrough. The fluid from either side of baffle 20, still having substantial horizontal components of flow, engages the fluid stream from the other side of the impingement baffle, the resultant combined fluid streams discharging in a vertical direction with essentially no horizontal component of flow.

Figure 5:
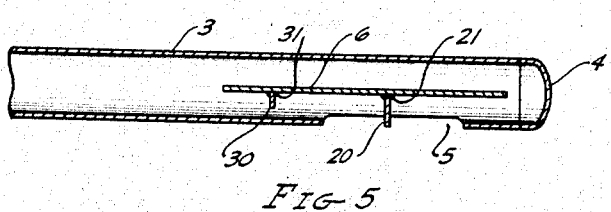
FIGURE 5 is an elevation view, in cross-section, illustrating the horizontal nozzle of FIGURE 3 having a partial vertical transverse baffle to achieve equal flow through each flow channel formed by the horizontal baffle.

Aperture 5 can be of any shape, and is typically of circular cross-section. An aperture of circular cross-section is preferred in the case where the aperture is located in a relatively flat surface, such as where conduit 3 is formed with a square or rectangular cross-section or where the diameter of the aperture is small in relation to the circumference of the conduit. However, in the usual case where conduit 3 is a length of pipe of circular cross-section, a circular aperture forms an oval discharge pattern, the longer axis of the oval lying normal to the axis of the pipe. This non-regular pattern is caused by the curvilinear shape of the aperture due to the curvature of the conduit walls. Particularly where the aperture covers a substantially large portion of the circumference of the conduit, the tendency is for the fluid to be discharged in an oval pattern. This effect can be largely minimized by utilizing an axially elongated aperture, as illustrated in FIGURE 5, wherein the aperture has a length parallel to the axis of the pipe greater than the width normal to the axis. Various shapes of elongated apertures may be employed to obtain more circular discharge patterns. One preferred shape being a generally rectangular slot with rounded ends, the length of the aperture being approximately 1.9 times as long as the circumferential width of the aperture and the corners being rounded to a radius of one half of the width.

The width of the aperture is limited by the size of the structure in which it is cut. In the case of a conduit of circular cross-section, the aperture width cannot exceed one half of the circumference of the conduit, being limited to this dimension by the position of the horizontal baffle. In practice, it is desirable to maintain the width substantially below this limitation to avoid the aforementioned side spray. There is no such limit to the length of the aperture so long as the aperture does not extend beyond the baffle, and preferably the aperture is removed from a position adjacent the end of the baffle sufficiently that fluid flowing around the end of the baffle is restored to substantially horizontal flow before impinging against opposed fluid at the aperture.

Where baffle 6 is sufficiently long and the aperture located relatively close to the end of the baffle adjacent closed end 4 of conduit 3, the flow through each of the flow channels formed by baffle 6 may be relatively equal. However, in most applications, the difference in flow length that the two fluid streams must traverse, and the additional resistance to the change in direction results in a large flow through the more direct of the flow channels. This flow imbalance may be overcome by inserting a restriction in the direct flow channel formed by horizontal baffle 6 having aperture 5 therein, the restriction being located opposite the aperture from the closed end 4 of conduit 3. The added restriction should be selected to achieve substantially equal flow of fluid to the aperture through each of the channels formed by the horizontal baffle. A convenient means of providing this additional resistance is illustrated in FIGURE 5, wherein partial vertical transverse baffle 30 is shown attached to horizontal baffle 6 by weld 31, or other convenient means. Partial baffle 30 has a cross-sectional area less than the cross-sectional area of the flow channel in which it is located so as to only partially restrict the flow of fluid therethrough.

In its broadest sense, the method of the invention encompasses flowing two or more confined fluid streams of substantially equal quantities and at substantially equal velocities in a horizontal direction toward a vertically directed outlet, the opposed fluids impinging against one another at the outlet, and commonly discharging through the outlet. The outlet may be merely an aperture in the conduit wall, as no special conduit extension to direct flow in the vertical direction is required. Since the fluid streams flowing toward the outlet are substantially equal in quantity and velocity, they possess substantially equal momentum. Because the confined fluids are flowing in a wholly horizontal direction within horizontal conduits, the momentum of the fluid is directed horizontally with essentially no vertical component. As the fluids impinge at the outlet, the momentum of the fluid streams flowing in the horizontal direction is almost wholly transformed into the vertical direction. Thus, the fluids issue from the outlet substantially in the vertical direction and uniformly distributed about a vertical axis to effect a symmetrical flow pattern. Desirably, the impinging streams are opposed at equal angles. Thus, in the case of two streams, the preferred direction of flow toward the outlet is along horizontal paths 180 degrees opposed, and with three streams, the flow toward the aperture is from directions spaced 120 degrees apart, etc.

In the usual case of introducing a fluid under pressure into a lower pressure fluid medium, the fluid to be injected is transported from a higher pressure source to the lower pressure medium by flowing through a closed conduit. Within the lower pressure medium and adjacent the point of discharge the conduit is oriented in a horizontal position, the fluid flowing therethrough in a substantially horizontal direction. The fluid to be injected is divided into two or more portions of substantially equal quantity to form first and second fluid streams flowing within separate channels of the conduit. The direction of flow of at least one of the fluid portions is reversed to cause the streams to flow in opposition to each other toward the previously described vertically directed outlet. The several fluid streams meet at the outlet and discharge vertically therefrom in a substantially symmetrical flow pattern.

Although the above-described apparatus is a preferred means of performing the method of the invention, it is apparent that the method of our invention can be practiced with other apparatus than specifically described, such as a conduit formed in a flat horizontal circle, or doughnut shape, having a fluid inlet and a vertically directed discharge aperture removed about the circle from the inlet; or with a horizontal conduit having a vertically directed aperture and fluid inlets at either end of the conduit, the fluid to be ejected flowing from either end of the conduit toward the aperture.

As previously mentioned, one application to which the injection nozzle of this invention is particularly suited is the injection of a cold quench fluid into a downwardly flowing mixed-phase reaction mixture as a means of cooling the reaction mixture and controlling the reaction temperature. The invention is equally applicable to the heating of a reaction mixture by the injection of a hot quench gas thereinto, or to the injection of a reactant fluid into a vertically flowing reactant mixture. The invention is particularly adaptable to the injection of a fluid into a contacting vessel at an intermediate point between spaced contacting zones within the vessel. In the aforesaid applications, it is often desirable to discharge the fluid onto a mixing tray. One particularly suitable tray for mixing the injected fluid with a downwardly flowing mixed liquid-gas phase fluid mass is the quench deck disclosed in pending application Ser. No. 355,870, filed Mar. 30, 1964. Where the injection nozzle is installed in combination with such apparatus, the nozzle is located immediately above the mixing tray.

Figure 8:
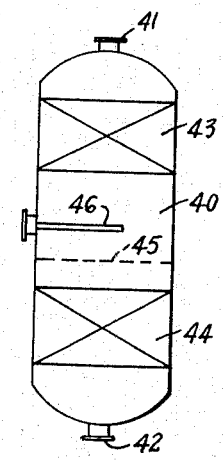
FIGURE 8 is a schematic diagram illustrating the installation of an injection nozzle in a contacting vessel for introducing a fluid thereinto intermediate two spaced contacting zones.

The above-described installation of the injection nozzle of this invention intermediate two spaced contacting zones of a contacting vessel is further illustrated in FIGURE 8 wherein is seen closed vertical contacting vessel 40 having a top fluid inlet nozzle 41 and a bottom fluid outlet nozzle 42. The contacting vessel contains an upper contacting zone 43 and a spaced lower contacting zone 44. Horizontal injection nozzle 46 is installed intermediate the contacting zones 43 and 44 in a manner previously described with reference to the installation of the injection nozzle 1 of FIGURE 1. Also, a mixing device 45 can be located in spaced relationship immediately above the lower contacting zone 44. Suitable mixing devices include the quench deck disclosed in the above-mentioned application Ser. No. 355,870, or alternatively other mixing trays can be employed. In those cases in which a mixing device is installed above the lower contacting zone, the injection nozzle is preferably installed immediately above the mixing device and below the upper contacting zone 43.

Our invention is illustrated by the following examples:

*Example I*

The distribution obtainable with an injection nozzle of this invention is measured in a laboratory mockup of a quench gas mixing apparatus installed in a downflow contacting vessel. The apparatus comprised a standard 22½-inch I.D. cylindrical steel drum with a 6-inch blower suction line through an intermediate point on the vertical side wall. A solid horizontal wood plate is installed at the very top of the drum and a second plate mounted 2½ inches below the top plate. Each tray has two 4-inch diameter, circular cutouts on 12-inch centers, symmetrically located about the center point of the tray. The holes in the lower tray are rotated 90 degrees from those of the upper tray. A 24-inch square, 6-inch deep wood box having a 17-inch diameter circular cutout in its bottom is secured to the top of the drum. The open top of the box is covered with wire screen.

An injection nozzle of design shown in FIGURE 3 is inserted through the side wall of the box, extending thereinto sufficiently that the nozzle aperture can be positioned at the center point of the drum. The nozzle is mounted 1¼ inches above the top plate and is rotatable so that the aperture may be directed vertically upwards or downwards. A 4-inch diameter impingement plate is located 1½ inches above the nozzle for the tests in which the nozzle is directed vertically upward. The nozzle is constructed of a length of 1-inch schedule 40 steel pipe having a cap welded on one end. The aperture is a 1-inch diameter cutout in the wall of the pipe centered 2⁷⁄₁₆ inches from the tip of the closed end of the pipe. The horizontal baffle is a 16 gage steel strip 6⅛ inches long and 1.049 inches wide welded in the pipe ¾ inch from the closed end. The vertical transverse baffle is positioned at the midpoint of the aperture.

In operation, a high capacity blower taken suction on the drum and draws air from the atmosphere down through the wire screen and mock mixing tray assembly. Air from a high pressure air source, containing a trace of Freon, is injected through the nozzle into the downwardly flowing air mass. A movable probe is inserted through a small hole in the side wall of the drum and the Freon content measured at a number of positions 2 inches beneath the bottom of the lower plate with a halogen leak detector. The relative Freon concentrations are indicative of the degree of distribution of the injected gas.

Figure 6:
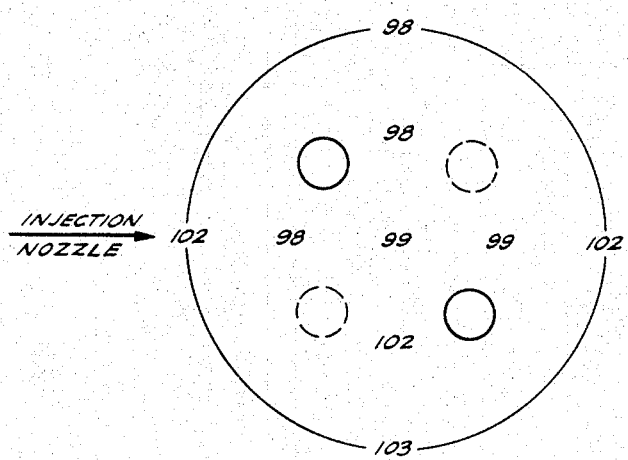
FIGURE 6 is an illustration of the relative distribution obtained with test apparatus having a vertically directed aperture pointed downwardly.
Figure 7:
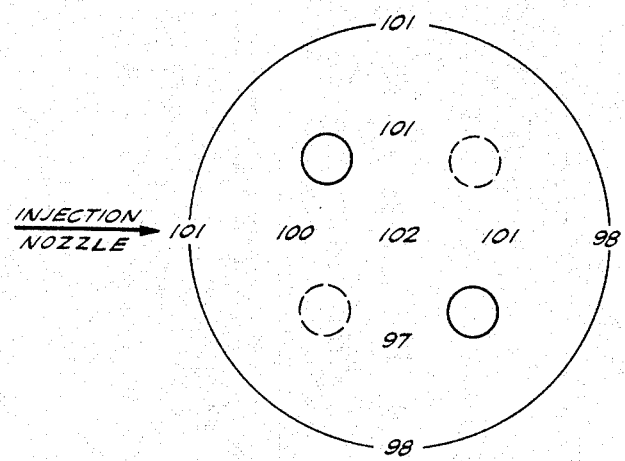
FIGURE 7 is a similar illustration showing the distribution obtained with the aperture directed upwardly.

Comparative data obtained with the nozzle aperture directed vertically upward and vertically downward are illustrated. Results obtained with the aperture directed vertically downward are illustrated in FIGURE 6 and results with the aperture directed upward are indicated in FIGURE 7. Each figure represents a cross-section of the drum taken 2 inches below the lower plate. The relative position of the quench nozzle is indicated at the left of each figure. The relative positions of the holes in the upper plate are indicated by the solid circles, and the relative position of the holes in the lower plate are indicated by the broken circles. The numbers indicate the relative Freon concentration at that respective location, with the number 100 corresponding to the average concentration. Thus, it is apparent that the nozzle aperture may be directed vertically upward or vertically downward with substantially equivalent performance, and that the deviation in the relative distribution of a gas injected into a lower pressure downwardly flowing gas media according to the present invention is less than 5 percent over the cross-section of the downwardly flowing gas.

*Example II*

The discharge pattern of the nozzle of Example I is determined by connecting the nozzle to an air supply, and with the aperture directed vertically downward, placing the nozzle just above a flat horizontal surface covered with a thin layer of fine dry sand. The discharge pattern can be varied by examining the manner in which the sand is blown from the surface. With the circular aperture of the test nozzle, the resulting discharge pattern is oval, the elongated axis lying normal to the axis of the nozzle.

It is determined that the symmetry of the discharge pattern is substantially improved with a nozzle having an axially elongated aperture. A nozzle constructed of 2-inch schedule 10 steel pipe and having an aperture 2⅜ inches long by 1¼ inches wide, with rounded corners cut on a ⅝-inch radius discharged a flow of improved symmetry.

Broadly, the method and apparatus of the invention are adapted to the vertical discharge of any fluid under pressure into a lower pressure fluid medium, and are particularly adapted to applications requiring symmetrical discharge of the ejected fluid. Our fluid injection method is equally applicable to the injection of a fluid into a fluid medium moving in any direction, either upwardly or downwardly or horizontally or, in fact, subject to no movement. Several modifications and embodiments have been particularly described and further modifications will be obvious to those skilled in the art. Such modifications and changes are intended to be included within the scope of this invention as defined by the following claims:

We claim:
1. A method of introducing a fluid under pressure into a lower pressure medium so that said fluid is discharged vertically into said medium in a substantially uniformly distributed flow pattern, which comprises:
   transporting said fluid from a higher pressure source to said lower pressure medium through an enclosed conduit, said fluid flowing in a substantially horizontal direction within said lower pressure medium;
   dividing said fluid flowing within said conduit into two portions of substantially equal quantity to form first and second fluid streams flowing within separate channels of said conduit;
   changing the direction of flow of at least one of said first and said second fluid streams to cause them to flow in opposition to each other toward a vertically directed aperture in said conduit; and
   discharging said first and said second opposed streams in a substantially vertical direction through said aperture.
2. The method defined in claim 1 wherein the flow of said first fluid stream is continued in the same direction as said fluid flowing within said conduit, and wherein the direction of flow of said second stream is reversed so as to flow toward said aperture in a direction opposite to said first stream.
3. A nozzle for discharging a horizontally flowing fluid in a substantially vertical direction which comprises:
   a horizontally positioned, elongated conduit having a closed end, said conduit also having a vertically directed aperture therein at a point removed from said closed end; and
   a horizontal baffle extending a distance along the length of said conduit and positioned so that said aperture is located intermediate along the length of said baffle, said baffle laterally extending from one inside wall of said conduit to the opposite inside wall thereof so as to divide the conduit into two axial flow channels of substantially equal cross-sectional area, said horizontal baffle terminating at a distance from said closed end of said conduit thereby providing fluid communication between said flow channels formed by said horizontal baffle.
4. The apparatus defined in claim 3 including a vertical transverse baffle attached to said horizontal baffle normal to the axis of said conduit and positioned adjacent and substantially at the midpoint of said aperture so as to divert fluid flowing in either direction toward said aperture outwardly through said aperture.
5. The apparatus defined in claim 3 wherein said conduit is a pipe having a circular cross-section and wherein said aperture is axially elongated, said aperture having a length parallel to the axis of said pipe greater than the width normal to said axis.
6. The apparatus defined in claim 3 wherein said vertically directed aperture is directed downwardly.
7. The apparatus defined in claim 3 including a partial restriction in the flow channel formed by said hori- zontal baffle having said aperture therein, said restriction being located opposite said aperture from said closed end of said conduit so as to achieve substantially equal flow of fluid to said aperture through each of said channels formed by said horizontal baffle.

8. The apparatus defined in claim 7 wherein said partial restriction is a vertical transverse baffle attached to said horizontal baffle normal to the axis of said conduit and displaced from said aperture away from said closed end of said conduit, said vertical transverse baffle having a cross-sectional area less than the cross-sectional area of the flow channel in which it is located so as to only partially restrict the flow of fluid therethrough.

9. A horizontal nozzle for discharging a fluid in a substantially vertical direction, which comprises:
- an elongated, horizontally mounted pipe having a closed end, said pipe also having a vertically directed elongated aperture therein at a point removed from said closed end of said pipe, said aperture having a length parallel to the axis of said pipe greater than the width thereof normal to said axis;
- a horizontal baffle extending a distance along the length of said pipe and positioned so that said aperture is located intermediate along the length of said baffle, said baffle extending across the diameter of said pipe from one inside wall of said pipe to the opposite inside wall thereof so as to divide the pipe into two axial flow channels of substantially equal cross-sectional area, said horizontal baffle terminating a distance of at least one half the diameter of said pipe from said closed end of said pipe; and
- a vertical transverse baffle attached to said horizontal baffle normal to the axis of said pipe and positioned adjacent and substantially at the midpoint of said aperture so as to divert fluid flowing in either direction toward said aperture outwardly through said aperture.

10. The apparatus defined in claim 5 wherein said vertically directed aperture is directed downwardly.

11. The apparatus defined in claim 5 including a second vertical transverse baffle positioned within the flow channel formed by said horizontal baffle having said aperture therein, said second transverse baffle being attached to said horizontal baffle normal to the axis of said pipe at a point displaced from said aperture away from said closed end of said pipe, said baffle having a cross-sectional area less than the cross-sectional area of said channel in which it is located so as to only partially restrict the flow of fluid therethrough and to thereby cause substantially equal quantities of fluid to flow to said aperture through each of said channels formed by said horizontal baffle.

12. In combination with a vessel, a horizontal nozzle for introducing a fluid into said vessel so that said fluid is vertically discharged in a substantially symmetrical flow pattern, which comprises:
- an elongated, horizontally mounted pipe communicating from the exterior of said vessel to the interior thereof through an opening in the side wall of said vessel, said pipe having a closed end on the interior of said vessel and said pipe also having a vertically directed elongated aperture therein located within said vessel at a point removed from said closed end of said pipe, said aperture having a length parallel to the axis of said pipe greater than the width thereof normal to said axis;
- means for sealing said opening in said vessel side wall to prevent the flow of the contents of said vessel outwardly therethrough around the exterior of said pipe;
- a horizontal baffle extending a distance along the length of said pipe and positioned so that said aperture is located intermediate along the length of said baffle, said baffle extending across the diameter of said pipe from one inside wall of said pipe to the opposite wall thereof so as to divide the pipe into two axial flow channels of substantially equal cross-sectional area, said horizontal baffle terminating a distance of at least one half the diameter of said pipe from said closed end of said pipe; and
- a vertical transverse baffle attached to said horizontal baffle normal to the axis of said pipe and positioned adjacent and substantially at the midpoint of said aperture so as to divert fluid flowing in either direction toward said aperture outwardly through said aperture.

13. The combination defined in claim 12 wherein said vertically directed aperture is directed downwardly.

14. The combination defined in claim 12 including a second vertical transverse baffle positioned within the flow channel formed by said horizontal baffle having said aperture therein, said second transverse baffle being attached to said horizontal baffle normal to the axis of said pipe at a point displaced from said aperture away from said closed end of said pipe, said baffle having a cross-sectional area less than the cross-sectional area of said channel in which it is located so as to only partially restrict the flow of fluid therethrough and thereby causing substantially equal quantities of fluid to flow to said aperture through each of said channels formed by said horizontal baffle.

15. The combination defined in claim 5 wherein said contacting vessel contains a plurality of spaced contacting zones located one above the other in said vessel, and wherein said horizontal nozzle is located in an intermediate space between adjacent contacting zones.

16. The combination defined in claim 15 including mixing means located in said space intermediate between said adjacent contacting zones and immediately below said nozzle for mixing fluid ejected from said nozzle with a second fluid flowing downwardly through said vessel.

References Cited

UNITED STATES PATENTS

| | | | |
|---|---|---|---|
| 553,709 | 1/1896 | Friedman | 137—592 X |
| 2,919,072 | 12/1959 | Corley | 239—565 X |
| 3,154,132 | 10/1964 | Mazzeo | 239—597 |

FOREIGN PATENTS

| | | |
|---|---|---|
| 615,805 | 1/1949 | Great Britain. |
| 71,512 | 5/1929 | Sweden. |
| 293,636 | 5/1951 | Switzerland. |

M. HENSON WOOD, Jr., *Primary Examiner.*

R. S. STROBEL, VAN C. WILKS, *Assistant Examiners.*

UNITED STATES PATENT OFFICE

CERTIFICATE OF CORRECTION

Patent No. 3,342,193                                   September 19, 1967

Roland F. Deering et al.

It is hereby certified that error appears in the above numbered patent requiring correction and that the said Letters Patent should read as corrected below.

Column 10, line 38, for the claim reference numeral "5" read -- 12 --.

Signed and sealed this 12th day of November 1968.

(SEAL)
Attest:

Edward M. Fletcher, Jr.                                  EDWARD J. BRENNER

Attesting Officer                                                    Commissioner of Patents